April 27, 1954
J. E. LA MARR
2,676,421
APPARATUS FOR USE IN TEACHING DANCING
Filed Aug. 2, 1950
2 Sheets-Sheet 1
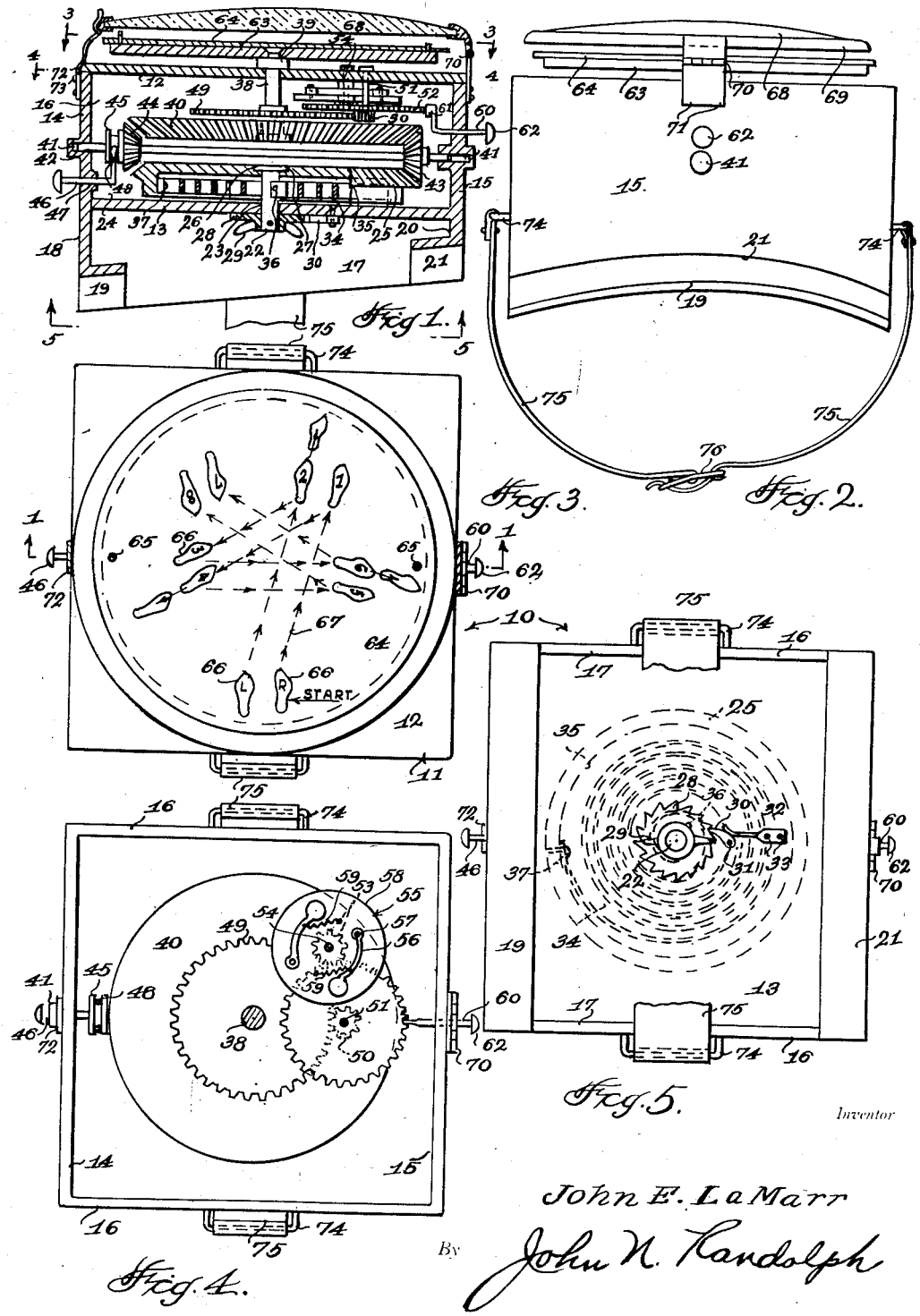
Inventor
John E. LaMarr
By John N. Randolph
Attorney April 27, 1954
J. E. LA MARR
2,676,421
APPARATUS FOR USE IN TEACHING DANCING
Filed Aug. 2, 1950
2 Sheets-Sheet 2
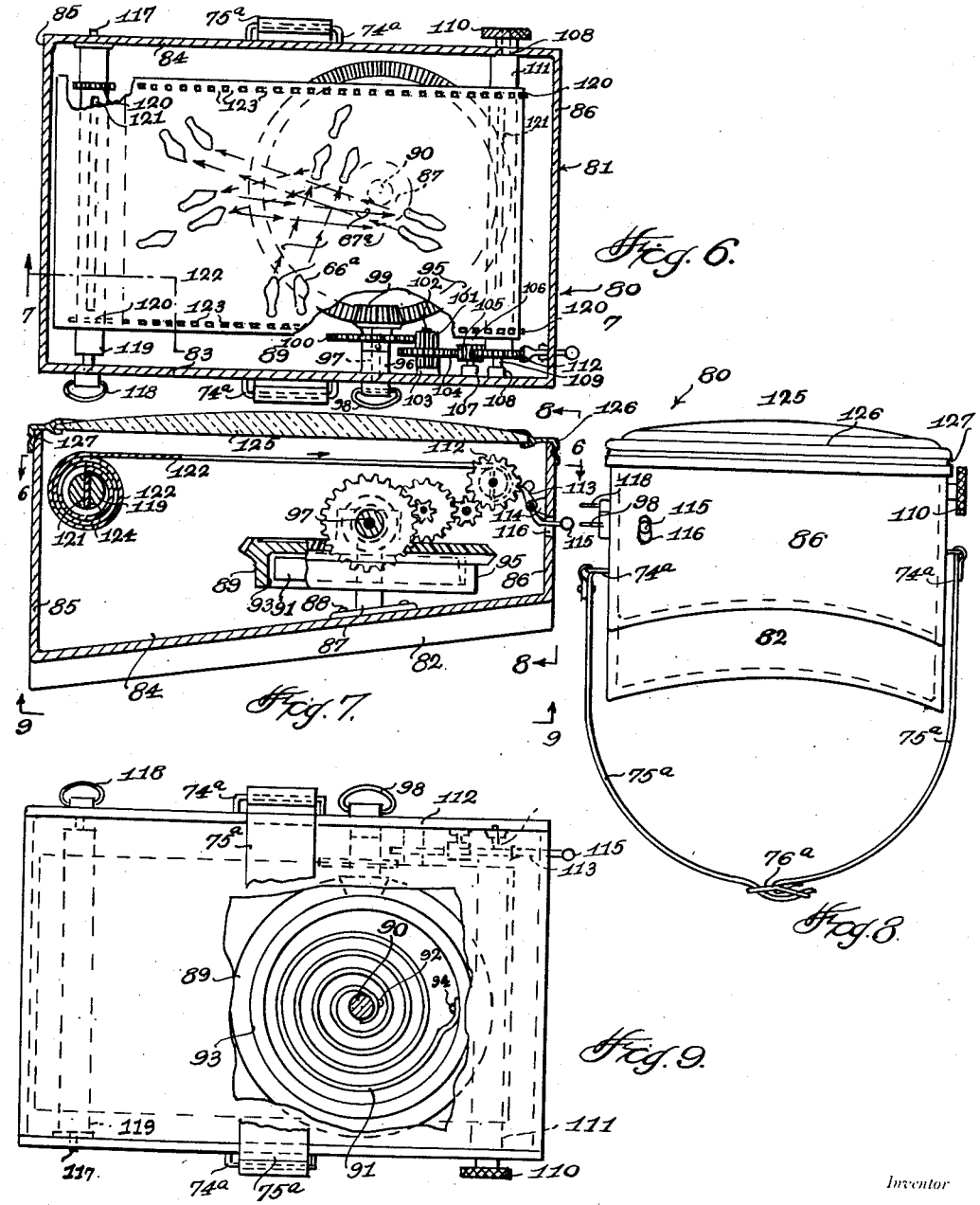
Inventor
John E. LaMarr
By John N. Randolph
Attorney Patented Apr. 27, 1954

2,676,421

UNITED STATES PATENT OFFICE 2,676,421

APPARATUS FOR USE IN TEACHING DANCING

John E. La Marr, Inginiyagala, Ceylon

Application August 2, 1950, Serial No. 177,169

2 Claims. (Cl. 35—29)

This invention relates to a novel apparatus or machine for use in teaching dancing or other precision movements and by which a sequence of dance steps are graphically represented in chart form.

More particularly, it is an aim of the present invention to provide means whereby the graphic representation of the series of dance steps are movable as the dance steps are accomplished by the student so that the position of the student at any point of the sequence of steps will be graphically represented by the portion of the chart disposed directly in the line of vision of the student and so that subsequent steps to be executed will also be in the correct line of vision of the student to thereby greatly facilitate the teaching of dancing by a graphic representation.

Still another object of the invention is to provide a machine or apparatus which is adapted to be worn on the wrist of the student and on which a chart bearing a representation of the steps of a dance sequence will be supported in a position visible to the student and moved by a part of the apparatus so that as the dance steps are executed the simulations thereof on the chart will move into positions to be readily visible to the student.

Still a further object of the invention is to provide an apparatus including means for moving the chart and which may be synchronized with music so that the step sequence illustrated by the chart will always be maintained in a proper position to be viewed by the student as the steps are being executed.

Various other objects and advantages of the invention will hereinafter become more fully apparent from the following description of the drawings, illustrating presently preferred embodiments of the invention, and wherein:

Figure 1 is a vertical sectional view of one embodiment of the invention taken substantially along a plane as indicated by the line 1—1 of Figure 3;

Figure 2 is an end elevational view of the apparatus looking from right to left of Figure 1;

Figure 3 is a plan view, partly in horizontal section, taken substantially along a plane as indicated by the line 3—3 of Figure 1;

Figure 4 is a horizontal sectional view taken substantially along a plane as indicated by the line 4—4 of Figure 1 and showing the complete apparatus as it would appear with the top wall of the casing removed;

Figure 5 is a bottom plan view of the apparatus;

Figure 6 is a horizontal sectional view, partly broken away, taken substantially along a plane as indicated by the line 6—6 of Figure 7, illustrating another embodiment of the invention;

Figure 7 is a longitudinal vertical sectional view thereof taken substantially along a plane as indicated by the line 7—7 of Figure 6;

Figure 8 is an end elevational view looking from right to left of Figures 6 and 7, and Figure 9 is a bottom plan view, partly broken away, of the apparatus as shown in Figures 6 and 7.

Referring more specifically to the drawings, and first with reference to the embodiment of the invention as illustrated in Figures 1 to 5, the dance step indicator or apparatus for use in teaching dancing, designated generally 10 includes a housing which is preferably substantially square and designated generally 11 having a top wall 12, a bottom wall 13, an end wall 14, an opposite end wall 15 and corresponding inner and outer side walls 16. The top wall 12 may be removably secured in any suitable manner to the remainder of the housing 11. The side walls 16 are provided with corresponding flanges 17 which depend below the bottom wall 13 and the bottom edges of which are correspondingly inclined from end-to-end thereof. The end wall 14 is provided with a depending flange 18 having an inturned bottom edge 19 which is concavely arced as viewed from below and which extends between the bottom edges of corresponding ends of the flanges 17 which depend the greatest distance below the bottom 13. The other end wall 15 is provided with a shorter depending flange 20 which extends only a slight distance below the bottom 13 and which has an inturned bottom edge portion 21, corresponding to the inturned edge portion 19 and which extends between the bottom edges of the flanges 17 which are disposed nearest the bottom 13.

A shaft 22 extends through a central opening 23 in the bottom wall 13 and is journaled therein and has an upper end extending a short distance upwardly into the compartment or chamber 24 defined by the walls of the housing or casing 11. A beveled ring gear 25 is rotatably disposed in the bottom portion of the chamber 24 and the upper portion of the shaft 22 extends centrally through and is journaled in the ring gear 25 and is provided with a head 26 which seats in an upwardly opening recess 27 of said ring gear and by which the ring gear is retained against upward displacement. A ratchet wheel 28 is fixed to the shaft 22 for rotation therewith and is disposed beneath the housing bottom 13 and a handle or turning knob 29 is fixed to the lower end of the shaft 22 below the ratchet wheel 28 to enable the shaft 22 to be manually revolved, for a purpose which will hereinafter become apparent. A pawl 30 is pivotally connected by a pivot pin 31 to the under side of the bottom 13 and the free end of said pawl is yieldably retained in engagement with the teeth of the ratchet wheel 28, all of which are inclined in the same direction, as seen in Figure 5, by a leaf spring 32 which is also secured to the under side of the bottom 13 at one end thereof by fastenings 33. It will be readily apparent that the pawl 30 will swing outwardly against the action of the spring 32 to allow the shaft 22 and ratchet wheel 28 to be turned by the knob or handle 29 in a counterclockwise direction, as seen in Figure 5, but will prevent said shaft from turning in a clockwise direction. A spring 34 is coiled in the downwardly opening recess 35 of the ring gear 25 and has its inner end fixed to the shaft 22 and its outer end fixed to the ring gear 25 as seen at 36 and 37, respectively. The shaft 22 is manually turned counterclockwise as seen in Figure 5 and as previously described for winding the spring 34 and when the spring is wound and the shaft 22 is held by the pawl 30 and ratchet wheel 28 it provides an anchor for the inner end of the wound spring and so that said spring will tend to revolve the ring gear 25 in a counterclockwise direction as seen in Figure 5 or clockwise as viewed from above.

A shaft 38 is journaled in the central portion of the top wall 12 and is provided with a collar 39 which bears upon the upper surface of the top wall 12. An upper beveled ring gear 40 is fixed to the lower end of the shaft 38 and is disposed directly above and spaced from the bottom ring gear 25 and is of the same diameter as said ring gear 25. The walls 14 and 15 are provided with aligned bearings 41 for journaling the ends of a shaft 42 which is reciprocally disposed in said bearings 41 and which extends between the walls 14 and 15 centrally through the space between the gears 25 and 40. Two small beveled pinions 43 and 44 are fixed to the shaft 41 adjacent its ends and a grooved collar 45 is fixed to the shaft 42 outwardly of the beveled pinion 44. An actuating rod 46 is reciprocally mounted in a boss 47 formed in the wall 14 and has an upturned bifurcated or forked inner end 48 which engages loosely in the annular groove of the collar 45 so that the collar 45 can turn with the shaft 42 relatively to the fork 48 but by displacing the rod 46 inwardly or outwardly of the wall 14, said collar 45, the shaft 42 and the pinions 43 and 44 will be displaced relatively to the ring gears 25 and 40 so that by pulling outwardly on the rod 46 the pinion 43 will be moved into meshing engagement with the gears 25 and 40 or by pushing inwardly on the rod 46 the pinion 44 will be moved into meshing engagement with the gears 25 and 40 and the pinion 43 moved out of engagement therewith, said pinions being spaced a sufficient distance apart so that both pinions cannot simultaneously mesh with or engage the gears.

A relatively large gear 49 is fixed to the shaft 38 above and adjacent the upper gear 40 and meshes with a small pinion 50 which is fixed to a shaft 51 which is journaled in and supported by the top wall 12 and depends therefrom. A larger gear 52 is fixed to the shaft 51 above the pinion 50 and meshes with a pinion 53 which is fixed to a shaft 54 which is likewise journaled in the top wall 12 and supported thereby and which extends downwardly into the chamber 24. A centrifugal governor, designated generally 55, is fixed to the shaft 54 above the pinion 53 and includes a pair of arms 56 having corresponding ends 57 which are pivotally mounted on disk 58 which is fixed to the shaft 54 and opposite weighted ends which are urged outwardly by centrifugal force for regulating the speed of rotation of the shaft 54 and accordingly of the other parts connected thereto including the shafts 38 and 22 and the ring gears 25 and 40. The pivoted arms 56 are drawn inwardly by contractile springs 59 which are connected thereto, adjacent their weighted free ends and each of which is anchored to the disk 58.

A rod 60 is reciprocally mounted in the housing wall 15 and has an upturned inner end which supports a blade 61 which engages between teeth of the gear 52 in one position of the rod 60 to provide a stop to prevent said gear and the other gears and shafts connected thereto from rotating when the rod 60 is projected inwardly of the housing 11, said rod having a knob 62 on its outer end disposed externally of the housing and by which it may be retracted outwardly to release the parts to be revolved by the spring 34.

A turntable 63 is secured to the upper end of the shaft 38 above the collar 39 and is disposed above the top wall 12 of the housing 11 and is adapted to support thereon a disk-shaped chart 64 which is held against rotation relatively to the turntable while resting thereon by upstanding pins 65 which rise from the turntable 63 and which extend through openings of the chart 64. The chart 64, as best illustrated in Figure 3, is shown provided with one sequence of a particular dance routine wherein the various steps constituting the dance sequence are graphically represented by simulated foot prints 66 certain of which bear the letters "L" and "R" representing the left and right foot, respectively, while other of the simulated foot prints 66 contain the numerals "1" through "8" representing successively the eight steps constituting the dance sequence. The simulated foot prints 66 are also connected by broken lines 67 having arrow heads indicating the direction of movement of the feet between the simulated foot prints.

The apparatus 10 is preferably provided with a magnifying lens 68 which is disposed above the chart 64 for magnifying the indicia 66, 67 thereon and which is supported in a frame 69 a part of which frame is supported by means of a hinge 70 having an upper leaf which is secured to a part of the frame 69 and a bottom leaf which is secured by fastenings 71 in the end wall 15. A spring clip 72 has a lower end which is fixed to the opposite end wall 14 by fastenings 73 and an upper free end which releasably engages another portion of the lens frame 69 to releasably support and retain the lens in a position over and substantially parallel to the chart 64 and to permit said lens to be released to swing upwardly on the hinge 70 so that the chart 64 may be removed from the turntable 63 and replaced by a chart having a different dance sequence 66, 67.

The side walls 16 are each provided with an outwardly projecting loop 74, to each of which loops is fastened an end of a wrist engaging strap 75. The free end of one of the straps 75 is provided with a buckle 76 by which the free end of the other strap 75 may be adjustably connected thereto, similar to a conventional wrist watch strap, and so that the housing 11 may thus be fastened on to the wrist and with the flange portions 19 and 21 bearing against the wrist and being curved to conform to the contour thereof. Likewise, due to the relative lengths of the flanges 18 and 20, the housing 11 will be supported at an incline so that it will be disposed at a proper angle for the chart 64 to be positioned in the correct line of sight of the wearer when the wrist bearing the apparatus 10 is held in a normal position for dancing on the shoulder of the dancing partner.

Assuming that the apparatus 10 has been previously wound before being attached to the wrist by manually turning the knob or handle 29, as previously described, and that the stop 60, 61 is in a position to prevent rotation of the gear 52 so that the gears 25 and 40 are likewise retained against rotation, after the apparatus 10 is attached to the wrist and with the chart 64 applied to the turntable 63 and disposed so that the indicia thereon will be in the position as illustrated in Figure 3 to be viewed by the dance student on whose wrist the apparatus is supported, the dance sequence as graphically illustrated by the chart 64 constitutes a right turn so that the student in executing this sequence and in moving the feet to the positions of the other simulated foot prints as consecutively numbered and along the broken arrow tip lines 67 will execute a right turn so as to be disposed facing approximately in the opposite direction to his or her starting position, before the dance routine is commenced the apparatus is released for operation so that the chart 64 will be similarly turned. Accordingly, the chart 64 will be turned by the turntable 63 in a counterclockwise direction, as seen in Figure 3, so that when the student has reached the position indicated by the simulated foot prints numbered "3" and "4" these foot prints 66 will then be disposed directly above the foot prints as seen in Figure 3 and bearing the legend "L" and "R." Likewise, as the sequence continues the chart 64 will continue to rotate counterclockwise so that when the student has completed the dance sequence the simulated foot prints numbered "7" and "8" will be disposed substantially in the position of the foot prints bearing the legend "L" and "R" as disclosed in Figure 3, so that at all times while dancing, the student will have the next steps to be taken disposed in his or her correct line of vision. This is readily accomplished in the example as illustrated by positioning the beveled pinion 43 in engagement with the gears 25 and 40 which may be accomplished by pulling outwardly on the shift rod 46 and before the stop 60, 61 is retracted outwardly to release the gear train. As the gear 25 rotates clockwise under the action of the spring 34, when viewed from above, this will cause the top gear 40 to turn counterclockwise and as the turntable 63 and gear 40 are both secured to the shaft 38 said turntable and the chart 64 will likewise revolve counterclockwise to accomplish the movement previously described, all considered as viewed from above or as seen in Figure 3. Accordingly, after the gear 43 has been set to its position of Figure 1, the student has only to pull outwardly on the stop rod 60 to allow the gear train to be operated for revolving the turntable counterclockwise and the centrifugal governor 55 functions to regulate the speed of rotation of the turntable and so that it can be readily synchronized with the tempo of the music to which the student is dancing. Obviously, other charts could be applied to the turntable 63 containing other dance sequences such as left turn, not shown, and in which case the shift rod 46 would be displaced inwardly to move the beveled gear 44 into meshing engagement with the gears 25 and 40 and the beveled gear or pinion 43 out of engagement with said gears, so that the turntable as viewed from above would then be revolved in the opposite direction or clockwise. Such other charts could obviously include charts to be used by dancing partners moving backward in making a left turn relatively to the other dancer of the pair who is moving forward, in which case the two dancing partners would be turning in opposite directions.

It will likewise be apparent that the apparatus may be employed without the chart turning or said chart could be manually turned by omitting the bottom gear 25 and spring 34 and extending one end of the shaft 42 outwardly of one of the bearings 41 and providing said shaft end with a turning knob, such as the knob 29, so that the gears 43 and 44 could then be manually shifted by the shaft 42 into and out of meshing engagement with the gear 40 and said gear 40 rotated by manual rotation of the shaft 42 to revolve the chart and its supporting turntable in either direction.

Figures 6 to 9, inclusive, illustrate another form of apparatus, designated generally 80, likewise intended to be employed as a visual means for teaching dancing or other precision movements of the feet and likewise including a housing or casing, designated generally 81, which is adapted to be strapped upon the wrist and similarly supported in a manner to be visible to the student on whose wrist the apparatus is mounted. The housing or casing 81 is preferably of elongated rectangular construction and has a longitudinally inclined bottom wall 82 which is upwardly arched transversely to fit the contour of the wrist and so that the upper surface of the housing will be supported at an incline for the same purpose as the incline support of the housing 11, so that the indicia contained therein will be in the correct line of vision to the student. The housing 81 includes corresponding side walls 83 and 84, and end walls 85 and 86. Said side walls and end walls have upper edges disposed at the same level but the end wall 85 extends downwardly a greater distance than the end wall 86, as clearly illustrated in Figure 7.

The side walls 83 and 84 are provided with strap loops 74a, intermediate of their ends, to which are attached corresponding ends of straps 75a, the opposite ends of which straps are adjustably connected by a buckle 76a, all as previously described in detail in reference to the apparatus 10.

A post or standard 87 is disposed in the housing 81 and projects upwardly from the housing bottom 82 to which it is secured by fastenings 88. A ring gear 89 is centrally supported on the upper end of the standard 87 and is journaled centrally thereof on a stem 90 which projects upwardly from the standard 87 and which extends loosely through a central opening of the ring gear 89. A spring 91, corresponding to the spring 34, is wound about the standard 87 and has its inner end secured thereto as seen at 92 in Figure 9. The spring 91 is disposed in a downwardly opening recess 93 of the gear 89 and the outer end of said spring is secured at 94 to the gear. The spring 91 is wound counterclockwise from its inner to its outer end as seen in Figure 9 or clockwise as viewed from above, so that when the gear 89, as viewed from above or as seen in Figure 6, is rotated by the unwinding of the spring 91 it will turn in a counterclockwise direction as indicated by the arrows 95 in Figures 6 and 7.

The side wall 83 is provided with a bearing extending therethrough, designated 96 including an inwardly extending boss in which is journaled a shaft 97 having a turning handle 98 secured to its outer end and which is disposed externally of the housing 81. A beveled pinion 99 is secured to the inner end of the shaft 97 and meshes with the beveled ring gear 89 and a gear 100 is secured to the shaft 97 between the inner end of the bearing 96 and the pinion 99 and said gear 100 meshes with a small pinion 101 which is fixed to a shaft 102 which is journaled at one end thereof in a bearing 103 provided in the housing wall 83. A gear 104 is also fixed to the shaft 102 and meshes with a small pinion 105 which is fixed to a shaft 106, one end of which is journaled in a bearing 107 formed in the wall 83.

The walls 83 and 84 are provided with aligned bearing 108, adjacent one end of the housing 81, in which is journaled a shaft 109 which extends between the walls 83 and 84 and one end of which extends outwardly through the wall 83 and is provided with a thumb knob 110 which is disposed externally of the housing 84, a drum 111 is fixed to the shaft 109 and is disposed within the housing 81 and a gear 112 is fixed to the shaft 109 between one end of the drum 111 and the wall 83 and meshes with the pinion 105. A pawl 113 is pivotally mounted intermediate of its ends on a bracket 114 which extends inwardly from the end wall 86 and said pawl has an upper end disposed for swinging movement into engagement between two of the teeth of the gear 112 to hold said gear against clockwise rotation as seen in Figure 7. The other, handle end 115 of the pawl 113 is curved outwardly with respect to the first mentioned, upper end of the pawl and extends outwardly through a vertically elongated opening 116 in the wall 86 which accommodates swinging movement of said end 115 whereby the pawl 113 may be swung into and out of engagement with the gear 112 and will normally be retained by the weight of the end 115 in a disengaged position relatively to the gear 112.

A shaft 117 extends through the casing 81 adjacent its opposite end and has end portions journaled in the side walls 83 and 84 and a turning handle 118 is secured to one end of the shaft 117 externally of the wall 83. A roller 119 is fixed to the shaft 117 between the walls 83 and 84 and said roller is provided adjacent each of its ends with sprocket teeth 120 and has a slot extending diametrically therethrough and extending longitudinally thereof between the sprocket teeth, as seen at 121. The roller 119 is provided with similar sets of sprocket teeth 120 which align with the sprocket teeth of the roller 119 and is likewise provided with a slot 121, corresponding to the slot of the roller 119.

A chart in the form of an elongated tape or strip 122 is wound on the idler roller 119 and is provided with a row of longitudinally spaced openings 123 adjacent each longitudinal edge thereof for receiving the teeth 120. A restricted end 124 of the strip 122 engages the slot 121 to combine with the teeth 120 to anchor said end of the strip 122 to the roller 119. The other end of the strip 122 extends longitudinally of the housing 81 and has a corresponding opposite end, not shown, which is engaged in the slot 121 of the drum 111. Certain of the openings 123 also engage the teeth 120 of the drum 111 to combine with the slot 121 to anchor the last mentioned end of the chart to the driven drum 111. The chart or strip 122 preferably has suitably printed or inscribed thereon a number of simulated or graphically represented dance step routines, one of which is illustrated in Figure 6 and which corresponds substantially to the dance routine as illustrated in Figure 3 including simulated foot prints 66a connected by broken lines bearing arrow heads and designated 67a.

Assuming that the spring 91 is wound and the pawl 113 is in an engaged position as seen in Figure 7, the apparatus can be secured to the wrist in the same manner as the apparatus 10 and the indicia 66a and 67a of the chart 122 which is disposed between the drums 111 and 119 will be visible through the open top of the housing 81 or through a magnifying lens 125 which is disposed thereover and which is mounted in a frame 126 which is detachably latched by a snap fastening 127 in a position to close the open top of the housing 81. The wearer of the apparatus 80 may then swing the handle end 115 downwardly to release the pawl 113 from the gear 112 so that the gear train 99, 100, 101, 104, 105 and 112 connecting the drum shaft 109 and the ring gear 89 will cause the drum 111 to be rotated clockwise as seen in Figure 7 when the gear 89 is revolved in the direction of the arrows 95 by unwinding of the spring 91. As the drum 111 is revolved clockwise for winding the tape 122 thereon, the tape will simultaneously be unwound from the idler drum 119 so that other dance routines, not shown, imprinted on the tape portion wound upon the drum 119 will be moved into view beneath the lens 125. Thus, a number of successive dance sequences or routines may be executed by the student following the different diagrams of the chart 122 as they are moved into view and which diagrams may have the simulated foot prints 66a disposed in different positions to be readily visible to the student and to form a continuation of a previous sequence or routine of the chart 122.

It will be readily apparent that the chart 122 may be replaced by a different chart by removing the lens 125 and its frame 126 and the spring 91 may be tensioned so that the movement of the chart will be synchronized with music to which the student is dancing. The spring is intended to be of sufficient strength so that all of the routines upon the strip or chart 122 may be caused to pass beneath the lens 125 before the spring is unwound. The spring 91 may be rewound by turning the handle 98 counterclockwise to turn the gear 89 clockwise as seen in Figure 6 and which will cause the drum 111 to be revolved counterclockwise as seen in Figure 7. When this occurs the tape 122 will be unwound from the drum 111 and the handle 118 may be simultaneously turned to revolve the drum 119 counterclockwise as seen in Figure 7 to rewind the tape thereon, if the same tape or chart is to be reused or the chart may be removed from the apparatus 80 as it is unwound from the drum 111 and another tape is then wound on the drum 119 by turning said drum counterclockwise by operation of its handle 118 and the operation previously described repeated.

Various modifications and changes are contemplated and may obviously be resorted to, without departing from the spirit or scope of the invention as hereinafter defined by the appended claims.

I claim as my invention:

1. An apparatus for use in teaching dancing by graphically illustrating the steps of a dance sequence including the directions of movement accomplished in completing the sequence, comprising a housing adapted to be worn on the wrist of a dance pupil, a dance step simulating chart containing indicia consisting of consecutively numbered left and right foot prints disposed in various spaced positions on the chart to indicate directions of movement in accomplishing successive steps of a dance sequence, means contained in said housing and supporting said chart, and actuating means including a spring motor contained in said housing and connected to the chart supporting means and imparting timed motion to the supporting means and chart whereby successively illustrated steps of a dance sequence will be moved into correct positions to be viewed by the pupil, certain of the successively numbered foot print indicia being disposed at different angles relatively to one another to graphically represent turns in a dance sequence, said chart supporting means comprising a turntable on which the chart is detachably mounted for rotation relatively to the housing whereby the next indicia of the sequence will always be disposed in an upright position relatively to the pupil's line of vision, and manually actuated means for reversing the direction of rotation of the turntable when driven by the spring motor.

2. An apparatus for use in teaching dancing by graphically illustrating the steps of a dance sequence including the directions of movement in accomplishing turns in completing the dance sequence, comprising a housing adapted to be worn on the wrist of a dance pupil, a dance step simulating chart containing indicia consisting of consecutively numbered left and right foot prints disposed in different angular positions on the chart to indicate the extent and direction of turning movement of successive steps of a dance sequence, a turntable contained in said housing and supporting said chart, and reversible actuating means including a spring motor contained in said housing and connected to the turntable and imparting timed turning motion in either direction to the turntable and chart for successively moving the consecutive graphically illustrated steps of the dance sequence depicted by the chart into a position normal to the line of view of the pupil.

References Cited in the file of this patent

UNITED STATES PATENTS

| Number | Name | Date |
|---|---|---|
| 1,277,645 | Rothkugel | Sept. 3, 1918 |
| 1,784,031 | Spenceman | Dec. 9, 1930 |
| 1,864,022 | Jewell | June 21, 1932 |
| 1,918,041 | Knapke | July 11, 1933 |
| 1,968,444 | Farber | July 31, 1934 |
| 1,997,511 | Canepa | Apr. 9, 1935 |
| 2,064,603 | Harrison | Dec. 15, 1936 |
| 2,192,257 | Champion et al. | Mar. 5, 1940 |
| 2,402,109 | Williams | June 11, 1946 |
| 2,444,224 | Gardner | June 29, 1948 |
| 2,504,318 | Freeman | Apr. 18, 1950 |